US010266727B2

(12) United States Patent
Botros

(10) Patent No.: US 10,266,727 B2
(45) Date of Patent: Apr. 23, 2019

(54) TIE LAYER ADHESIVES HAVING GRAFT COMPOSITIONS FOR BONDING TO METAL SUBSTRATES

(75) Inventor: Maged G. Botros, Liberty Township, OH (US)

(73) Assignee: Equistar Chemicals, LP, Houston, TX (US)

( * ) Notice: Subject to any disclaimer, the term of this patent is extended or adjusted under 35 U.S.C. 154(b) by 725 days.

(21) Appl. No.: 13/876,907

(22) PCT Filed: Sep. 29, 2011

(86) PCT No.: PCT/US2011/053897
§ 371 (c)(1),
(2), (4) Date: Jun. 17, 2013

(87) PCT Pub. No.: WO2013/044776
PCT Pub. Date: Apr. 5, 2012

(65) Prior Publication Data
US 2013/0260064 A1 Oct. 3, 2013

Related U.S. Application Data

(63) Continuation of application No. 12/924,540, filed on Sep. 29, 2010, now Pat. No. 8,637,159.

(51) Int. Cl.
*B32B 7/12* (2006.01)
*B32B 15/085* (2006.01)
*B32B 37/04* (2006.01)
*B32B 37/12* (2006.01)
*C09J 123/16* (2006.01)
*C09J 5/00* (2006.01)
*B32B 27/08* (2006.01)
*B32B 27/30* (2006.01)
*B32B 27/32* (2006.01)
*B32B 27/34* (2006.01)
*C08F 255/02* (2006.01)
*C08F 291/02* (2006.01)
*C08L 23/08* (2006.01)
*C08L 23/16* (2006.01)
*C09J 123/06* (2006.01)
*C09J 123/08* (2006.01)
*C09J 7/28* (2018.01)
*C09J 7/29* (2018.01)
*C08L 51/00* (2006.01)
(Continued)

(52) U.S. Cl.
CPC ............... *C09J 5/00* (2013.01);
*B32B 7/12* (2013.01); *B32B 15/085* (2013.01);
*B32B 27/08* (2013.01); *B32B 27/306* (2013.01); *B32B 27/308* (2013.01); *B32B 27/32* (2013.01); *B32B 27/34* (2013.01); *B32B 37/04* (2013.01); *C08F 255/02* (2013.01); *C08F 291/02* (2013.01); *C08L 23/0815* (2013.01); *C08L 23/16* (2013.01); *C08L 51/003* (2013.01); *C09J 7/28* (2018.01); *C09J 7/29* (2018.01); *C09J 123/06* (2013.01); *C09J 123/0815* (2013.01); *C09J 123/16* (2013.01); *B32B 2037/1215* (2013.01); *B32B 2250/05* (2013.01); *B32B 2250/24* (2013.01); *B32B 2250/246* (2013.01); *B32B 2270/00* (2013.01); *B32B 2274/00* (2013.01); *B32B 2307/412* (2013.01); *B32B 2307/7242* (2013.01); *B32B 2439/70* (2013.01); *C08L 51/04* (2013.01); *C08L 51/06* (2013.01); *C08L 2205/03* (2013.01); *Y10T 428/13* (2015.01); *Y10T 428/2804* (2015.01); *Y10T 428/31692* (2015.04); *Y10T 428/31913* (2015.04); *Y10T 428/31917* (2015.04); *Y10T 428/31924* (2015.04); *Y10T 428/31938* (2015.04)

(58) Field of Classification Search
CPC .... C08F 291/00; C08F 291/02; C08F 255/00; C08F 255/02; B32B 15/08; B32B 15/085; B32B 7/12; B32B 37/04; C09J 123/06; C09J 123/0815; C09J 123/16
See application file for complete search history.

(56) References Cited

U.S. PATENT DOCUMENTS

| 3,868,433 | A | 2/1975 | Bartz et al. |
| 4,198,327 | A | 4/1980 | Matsumoto et al. |
| 4,619,972 | A | 10/1986 | Inoue et al. |

(Continued)

FOREIGN PATENT DOCUMENTS

| EP | 0014018 | 8/1980 | |
| WO | WO 2009035885 A1 * | 3/2009 | ............... B32B 1/08 |

OTHER PUBLICATIONS

Chen, Improvement of shear strength of aluminum-polypropylene lap joints by grafting maleic anhydride onto polypropylene, International Journal of Adhesion & Adhesives 27 (2007), pp. 175-187.*

(Continued)

*Primary Examiner* — Monique R Jackson

(57) ABSTRACT

Tie-layer adhesives having graft compositions for bonding to metal substrates is disclosed. The graft compositions are made up of the reaction product of a live, grafted polyolefin and an olefin elastomer. The grafted polyolefin is first made by heating a polyolefin and an unsaturated monomer. Further reaction of the live, grafted polyolefin with an olefin elastomer provides the graft composition. Grafting efficiency is boosted dramatically by the presence of the olefin elastomer and use of the additional reaction step. The graft composition, when formulated into a tie-layer adhesive provides improved bonding to metal substrates.

8 Claims, 1 Drawing Sheet

(51) Int. Cl.
  *C08L 51/04* (2006.01)
  *C08L 51/06* (2006.01)

(56) References Cited

U.S. PATENT DOCUMENTS

| | | | | |
|---|---|---|---|---|
| 5,296,552 | A * | 3/1994 | Ohmae | C08F 255/00 525/193 |
| 5,643,999 | A | 7/1997 | Lee et al. | |
| 6,177,516 | B1 * | 1/2001 | Hudak | C08J 7/047 525/71 |
| 6,475,633 | B1 * | 11/2002 | Robert | B32B 7/12 428/476.9 |
| 6,653,494 | B2 * | 11/2003 | Akbarali | C07F 9/145 558/96 |
| 7,064,163 | B2 | 6/2006 | Shida | |
| 7,157,521 | B2 * | 1/2007 | Wang | C08K 5/09 524/284 |
| 8,637,159 | B2 * | 1/2014 | Botros | B32B 7/12 428/516 |
| 8,742,016 | B2 * | 6/2014 | Besser | C08F 2/36 525/71 |
| 2004/0034166 | A1 | 2/2004 | Botros | |
| 2004/0097637 | A1 | 5/2004 | Botros | |
| 2004/0116610 | A1 | 6/2004 | Bernard Boutevin et al. | |
| 2007/0054142 | A1 | 3/2007 | Lee et al. | |
| 2007/0071988 | A1 | 3/2007 | Botros | |
| 2007/0167569 | A1 | 7/2007 | Botros | |
| 2008/0032148 | A1 | 2/2008 | Lee et al. | |
| 2008/0163978 | A1 | 7/2008 | Botros | |
| 2009/0035594 | A1 | 2/2009 | Botros | |
| 2009/0149581 | A1 * | 6/2009 | Zenner | C08K 5/13 524/100 |
| 2010/0174036 | A1 | 7/2010 | Botros | |
| 2010/0304051 | A1 | 12/2010 | Henschke et al. | |

OTHER PUBLICATIONS

PCT International Search Report & Written Opinion dated Dec. 2, 2011, for PCT/US2011/053897.

* cited by examiner

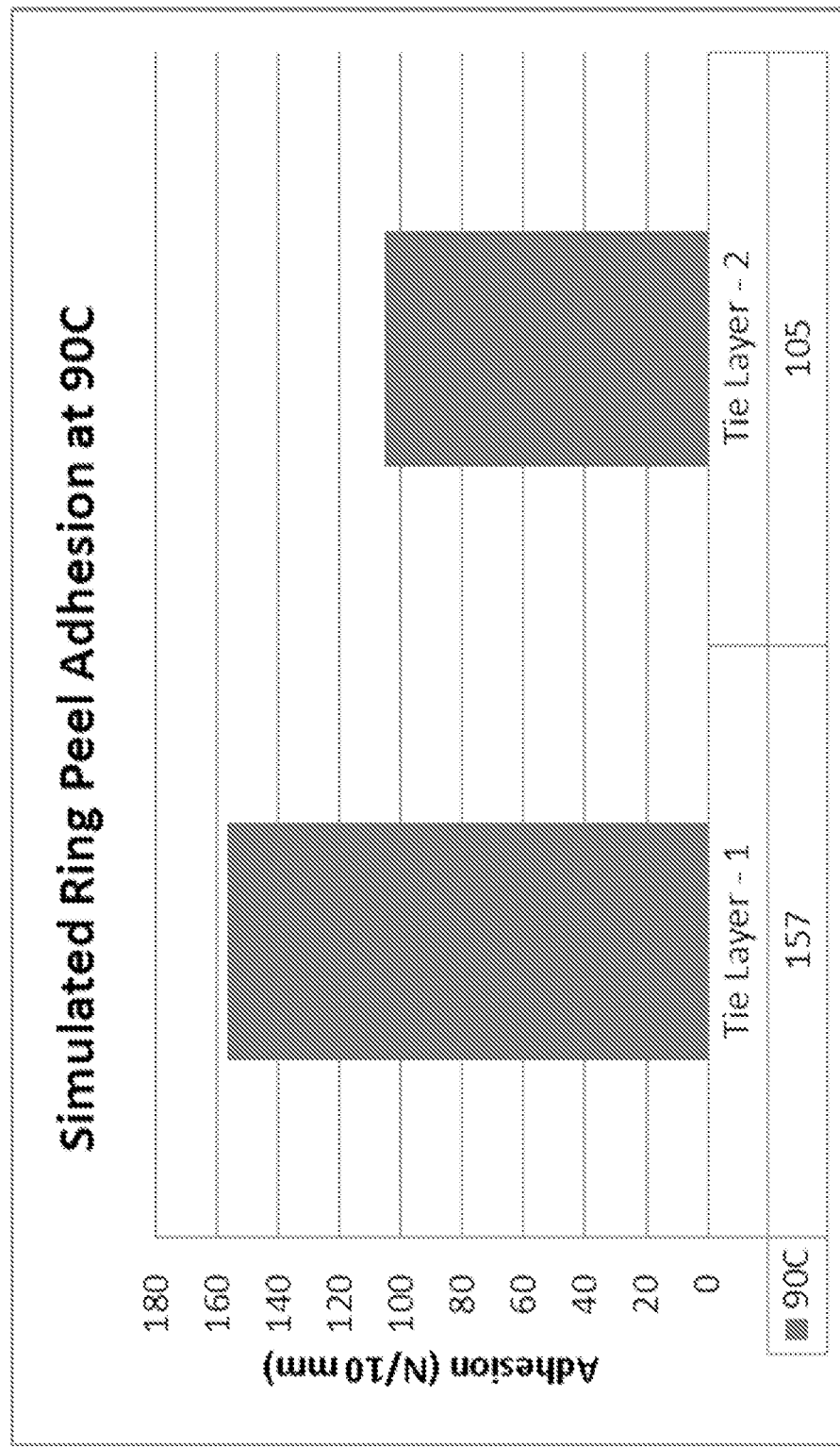

TIE LAYER ADHESIVES HAVING GRAFT COMPOSITIONS FOR BONDING TO METAL SUBSTRATES

CROSS REFERENCE TO RELATED APPLICATIONS

This application is the U.S. National Phase of PCT International Application PCT/US2011/053897, filed Sep. 29, 2011, claiming benefit under 35 U.S.C. 119(e) of US application Ser. No. 12/924,540, filed Sep. 29, 2010, the contents of which are incorporated herein by reference in their entirety.

FIELD OF THE INVENTION

The disclosure relates to grafted compositions, particularly compositions useful in tie-layer adhesives for improved bonding to metal substrates.

BACKGROUND OF THE INVENTION

Tie-layer adhesives are used to bond polyolefins to dissimilar substrates in multilayer, co-extruded structures, particularly for blown and cast film, extrusion coating, blow molding, sheet extrusion, wire & cable, pipe, and other industrial applications. The tie-layer adhesive typically comprises a polyolefin base resin, which is the predominant component, and a grafted polyolefin. The grafted polyolefin is produced by reacting a polyolefin with an unsaturated monomer at elevated temperatures with or without a free-radical initiator. Commercially available tie-layer adhesives include Plexar® resins, product of Equistar Chemicals, LP, which are anhydride-modified polyolefins.

In addition to the base resin and grafted polyolefin, tie-layer adhesives commonly include other polymer resins or additives to provide better adhesion, clarity, or other benefits. Usually, there are tradeoffs. For instance, modifications that improve adhesion often reduce clarity, and vice versa.

Elastomers—random or block copolymers—are commonly included in tie-layer adhesive compositions to improve compatibility, increase adhesion, or impart other benefits. Styrene-based block copolymers, for instance, have been used to improve adhesion in multilayer constructions that require bonding of polyethylene to a styrenic polymer (U.S. Pat. Appl. Publ. Nos. 2007/0071988 and 2007/0167569).

Other commonly used elastomers include olefin elastomers, such as ethylene-propylene rubber (EPR) or ethylene-propylene-diene monomer rubber (EPDM). Many references teach to blend an olefin elastomer with other tie-layer adhesive components (see, e.g., U.S. Pat. Appl. Publ. Nos. 2004/0097637, 2008/0032148, 2009/0035594, and 2010/0174036), but none of these to references suggests reacting the olefin elastomer with the grafted polyolefin during the manufacture of the grafted polyolefin.

Clarity of multilayer films is often an issue, particularly for the food packaging industry. Wraps for meat and cheese, snack foods, baking mixes, and many others uses require barrier layers (e.g., EVOH, polyamides, polyolefins) to prevent transmission of oxygen and/or moisture, and making such structures with high clarity poses a formidable challenge. Additives, such as the bicyclic modifiers of U.S. Pat. Appl. Publ. No. 2007/0054142, are sometimes employed to improve clarity without sacrificing adhesion.

U.S. Pat. Appl. Publ. No. 2010/0174036 teaches that tie-layer adhesives useful for multilayer films having a favorable balance of clarity and adhesion can be made by blending, in sequence, a grafted ("maleated") polyolefin, a polyolefin elastomer, and LLDPE. Again, there is no suggestion to react the polyolefin elastomer with the grafted polyolefin.

Improved tie-layer adhesive compositions suitable for use in making multilayer structures with good adhesion and high clarity are needed. A valuable approach would avoid expensive additives and performance tradeoffs. Ideally, improved tie-layer adhesives could be made using economical starting materials, commonly used equipment, and familiar techniques.

SUMMARY OF THE INVENTION

In one aspect, the present disclosure relates graft compositions (hereinafter also sometimes referred to as "graft [polyolefin/elastomer] compositions") for use in tie-layer adhesives having improved bonding to metal substrates. The compositions comprise the reaction product of a live, grafted polyolefin and an olefin elastomer. In another aspect, the invention relates to a process for making graft compositions. The process comprises heating a polyolefin and an unsaturated monomer under conditions effective to produce a live, grafted polyolefin, and then further reacting the grafted polyolefin and any residual polyolefin and/or unsaturated monomer with an olefin elastomer. Surprisingly, grafting efficiency is boosted dramatically by the presence of the olefin elastomer and use of the additional reaction step. The invention includes tie-layer adhesives that include the graft compositions and multilayer films and sheets that incorporate the adhesives. The graft composition, when formulated into a tie-layer adhesive at relatively low concentration, affords multilayer structures with an unexpected improved bonding to metal substrates.

BRIEF DESCRIPTION OF THE DRAWINGS

Embodiments of the present application are described, by way of example, with reference to the following FIGURE, wherein:

FIG. 1 illustrates the results of the ring peal test for Tie layer 1 and comparative Tie layer 2 described in the examples of the present application.

DETAILED DESCRIPTION OF THE INVENTION

Graft compositions of the invention comprise reaction products of a live, grafted polyolefin and an olefin elastomer.

Live, grafted polyolefins suitable for use in making the graft compositions are manufactured by reacting polyolefins with unsaturated monomers at elevated temperatures, with or without a free-radical initiator, under conditions effective to graft unsaturated monomer units onto the polyolefin backbone.

Polyolefins suitable for making the live, grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified poly-propylenes, and the like, and blends thereof. Preferred polyolefins for making the grafted polyolefin are polyethylenes, particularly HDPE and LLDPE, and especially HDPE.

An unsaturated monomer reacts with the polyolefin to produce the grafted to polyolefin. Suitable unsaturated monomers are also well known. Preferred unsaturated monomers are ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. Appl. Publ. Nos. 2004/0097637 and 2007/0054142, the teachings of which are incorporated herein by reference.

The relative amounts of unsaturated monomer and polyolefin used will vary and depend on factors such as the nature of the polyolefin and unsaturated monomer, reaction conditions, available equipment, and other factors. Usually, the unsaturated monomer is used in an amount within the range of 0.1 to 15 wt. %, preferably from 0.5 to 6 wt. %, and most preferably from 1 to 3 wt. %, based on the amount of live, grafted polyolefin produced.

Grafting is accomplished according to known procedures, generally by heating a mixture of the polyolefin and unsaturated monomer(s). Most typically, the grafted polyolefin is prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting step. A free-radical initiator such as an organic peroxide can be employed but is not necessary.

Grafting of the unsaturated monomer and polyolefin to generate the live, grafted polyolefin is performed at elevated temperatures, preferably within the range of 180° C. to 400° C., more preferably from 200° C. to 375° C., and most preferably from 230° C. to 350° C. Shear rates in the extruder can vary over a wide range, preferably from 30 to 1000 rpm, more preferably from 100 to 600 rpm, and most preferably from 200 to 400 rpm.

By "live, grafted polyolefin," we mean a grafted polyolefin that can further react with added olefin elastomer and any residual polyolefin, unsaturated monomer, and/or free-radical initiator used to make the grafted polyolefin. Commercially available grafted polyolefins are not "live" because the free-radical content has reacted out or has been quenched during workup of the product, typically during pelletization. A live, grafted polyolefin contains active free-radical species generated thermally by visbreaking or from peroxide decomposition. The residual radical content allows reaction to continue upon combination of the freshly made grafted polyolefin, usually while still molten, with an added olefin elastomer. One or more of the grafted polyolefin, olefin elastomer, residual polyolefin, and residual unsaturated monomer may be involved in this secondary reaction.

Thus, in the second process step for making the graft composition, the live, grafted polyolefin (and any residual polyolefin and/or unsaturated monomer) is reacted with an olefin elastomer. This reaction can be performed using any suitable reactor. Conveniently, the reaction is performed by combining the freshly prepared live, grafted polyolefin with the olefin elastomer in a shear-imparting extruder/reactor as described earlier. In one particularly preferred approach, the live, grafted polyolefin is transferred while still molten from an outlet of a first extruder directly to a second extruder in which a reaction with the olefin elastomer occurs.

The amount of olefin elastomer used depends on the nature of the elastomer and grafted polyolefin, the desired tie-layer properties, reaction conditions, equipment, and other factors. Generally, however, the amount of elastomer used will be in the range of 5 to 60 wt. %, more preferably from 20 to 50 wt. %, and most preferably from 30 to 40 wt. %, based on the amount of graft composition produced.

The live, grafted polyolefin and the olefin elastomer react at elevated temperature, preferably at temperatures within the range of 120° C. to 300° C., more preferably from 135° C. to 260° C., and most preferably from 150° C. to 230° C. Preferably, the temperature for the reaction used to make this graft composition is lower than that used to make the live, grafted polyolefin. Shear rates in the extruder for this step can vary over a wide range, preferably from 30 to 1000 rpm, more preferably from 100 to 600 rpm, and most preferably from 200 to 400 rpm.

The resulting graft [polyolefin/elastomer] composition is conveniently quenched and pelletized at this point, but it can be combined immediately after preparation with base resin as is described further below.

Suitable olefin elastomers include ethylene-propylene rubber (EPR), ethylene-propylene-diene monomer rubber (EPDM), the like, and mixtures thereof. As used herein, "elastomer" refers to products having rubber-like properties and little or no crystallinity. Preferably, the olefin elastomers contain from 10 to 80 wt. % of ethylene recurring units. More preferred olefin elastomers contain from 10 to 70 wt. % of ethylene units. Commercially available olefin elastomers include Lanxess Corporation's Buna® EP T2070 (68% ethylene, 32% propylene); Buna EP T2370 (3% ethylidene norbornene, 72% ethylene, 25% propylene); Buna EP T2460 (4% ethylidene norbornene, 62% ethylene, and 34% propylene); ExxonMobil Chemical's Vistalon® 707 (72% ethylene, 28% propylene); Vistalon 722 (72% ethylene, 28% propylene); and Vistalon 828 (60% ethylene, 40% propylene). Suitable ethylene-propylene elastomers also include ExxonMobil Chemical's Vistamaxx® elastomers, particularly grades 6100, 1100, and 3000, and Dow Chemical's Versify® elastomers, particularly grades DP3200.01, DP3300.01, and DP3400.01, which have ethylene contents of 9, 12, and 15 wt %, respectively. Additional EPDM rubbers include Dow's Nordel™ hydrocarbon rubber, e.g., the 3722P, 4760P, and 4770R grades.

I surprisingly found that high grafting efficiencies can be achieved when live, grafted polyolefins are further reacted with an olefin elastomer. Normally, polyolefin grafting proceeds less than quantitatively. For instance, in a typical process for grafting maleic anhydride onto high density polyethylene, the efficiency usually ranges from 80 to 85%. In contrast, nearly quantitative conversion of the unsaturated monomer can be accomplished when a live, grafted polyolefin is further reacted with an olefin elastomer.

Preferably, at least 90 wt. %, more preferably at least 95 wt. %, and most preferably at least 98 wt. %, of the unsaturated monomer is incorporated into the graft composition. The amount incorporated can be measured by wet chemical methods (titration, etc.) or more preferably by Fourier transform infrared spectroscopy (FTIR) according to methods that are well known in the art.

The graft composition is a valuable component of a tie-layer adhesive. Tie-layer adhesives of the invention comprise from 2 to 50 wt. % of the graft [polyolefin/ elastomer] and from 50 to 98 wt. % of a base resin (also called a "let-down" resin). More preferred tie-layer adhesives comprise from 5 to 30 wt. % of the graft composition and from 70 to 95 wt. % of the base resin. Most preferred adhesives comprise from 15 to 25 wt. % of the graft composition and from 75 to 85 wt. % of the base resin. An advantage of the graft compositions, elaborated upon later, is the ability to use a relatively low concentration in the tie-layer adhesives while achieving good adhesion.

Suitable base resins for the tie-layer adhesives include ethylene homopolymers; copolymers of ethylene with $C_3$-$C_8$ α-olefins, vinyl carboxylates and alkyl acrylates; terpolymers of ethylene and propylene with diene monomers; propylene homopolymers; polyisobutylene; and copolymers of isobutylene and isoprene. Ethylene homopolymers and copolymers can include LDPE; MDPE; HDPE; LLDPE; very low density polyethylene; ultra low density polyethylene; ethylene-vinyl acetate (EVA) copolymers; ethylene-acrylate copolymers such as ethylene-ethyl acrylate copolymer and ethylene-n-butyl acrylate copolymers; and blends thereof.

LLDPE is a preferred base resin. In particular, the LLDPE is preferably a copolymer of ethylene and 1-butene, 1-hexene, or 1-octene. Preferably, the LLDPE has a density within the range of 0.895 to 0.925 g/cm$^3$ and a melt index ($MI_2$) within the range of 0.5 and 5 g/10 min, more preferably from 0.8 to 2.5 g/10 min. Suitable LLDPE base resins include the Petrothene® GA502, GA503, GA602, and GA616 series resins, which are products of Equistar Chemicals, LP.

In a preferred aspect, the process for making the graft [polyolefin/elastomer] composition is integrated with a process for making the base resin. In this process, freshly made polyethylene powder (e.g., LLDPE) is blended in line with the graft composition to generate a mixture that is useful as a masterbatch or as a tie-layer adhesive. The graft composition can be in the form of pellets or it can be combined with the base resin powder immediately after the graft composition is produced. In either case, the "in-line" process affords products with reduced thermal history and, frequently, improved properties (see U.S. Pat. No. 7,064,163, the teachings of which are incorporated herein by reference).

In addition to the base resin and the graft composition, the tie layer adhesive can include other commonly used components, including adhesion promoters, elastomeric polymers, UV inhibitors, antioxidants, thermal stabilizers, and the like. For some examples of these, see U.S. Pat. Appl. Publ. No. 2004/0097637, the teachings of which are incorporated herein by reference.

A particularly preferred tie-layer adhesive comprises from 5 to 30 wt. %, preferably from 15-25%, of a particular graft composition and 70-95 wt. %, preferably 75-85 wt. %, of LLDPE as the base resin. This graft composition is made by grafting maleic anhydride onto HDPE, followed by further reaction of the live, grafted polyolefin with EPR or EPDM, particularly EPR. Such compositions provide good adhesion and high clarity with less grafted material than is commonly needed when EPR or EPDM is simply blended with a grafted HDPE.

The tie-layer adhesives are valuable for bonding dissimilar materials in multilayer constructions, particularly films, sheets, pipes and other products. In particular, the adhesives are useful for bonding plastic, wood, glass, paper, composite, and metal substrates. They can be used in lamination, extrusion (or coextrusion), sheet extrusion, extrusion coating, injection molding, blow molding, melt thermoforming, and other processes.

In particular it has been found that the tie layer adhesive compositions disclosed herein provide stronger bonding to metal substrates. Preferred substrates are metals, including metal oxides and alloys. Suitable metals include those in groups 1-16 of rows 1-6 in the Periodic table. Metals can include alkali metals, alkaline metals, transition metals, and post transition metal elements of Groups 13-16. Preferred metals include those in rows 1-4 of the Periodic table. Particularly preferred metals include aluminum, tin, zinc, nickel, copper, platinum, gold, silver, palladium, chromium, cobalt, steel, or iron and mixtures thereof. Additional preferred alloys include brass, bronze, steel. Metals disclosed herein can be included with non-metal compounds to form a composite.

In some embodiments tie layers bonded to metal substrates have an adhesive strength of 120 N/10 mm or more, alternatively 135 N/10 mm or more, and alternatively 150 N/10 mm or more, alternatively 160 N/10 mm, alternatively in a range of from 120 to 185 N/10 mm, alternatively from 135 to 170 N/10 mm, alternatively from 150 to 160 N/10 mm, when a tie layer adhesive 5"×2" 1" strip is pulled from a metal substrate at 50 mm/min at a temperature of 90° C. (See Examples).

The adhesives are particularly valuable for making multilayer polyolefin/metal structures used in several applications such as multi-layer pipe applications, building panels and truck panel applications. The adhesives can also be used in films and sheets, including barrier films. The multilayer films have at least two layers in addition to the adhesive layer, which bonds the other layers together. Usually, at least one layer serves as a barrier layer. Multilayer films, typically made by coextrusion, frequently include a polyolefin layer such as LDPE, LLDPE, HDPE, EVA, ethylene-acrylic acid copolymers, ethylene-methacrylic acid copolymers, ethylene-acrylic acid ester copolymers, ethylene-methacrylic acid ester copolymers, ionomers, and the like. Barrier resins used are typically ethylene-vinyl alcohol (EVOH) or polyamide resins such as nylon.

Multilayer barrier films are widely used for food packaging, and in most of these applications, clarity and high adhesion are important. Food packaging applications include formed bags, pouches, and casings for packaging meat and poultry products. They can also be used for snack foods, cereals, baking mixes, and the like. They may also have utility for cook-in packaging.

Analysis of the interface between the adhesive and barrier layers in multilayer barrier structures reveals interesting attributes of the inventive tie layers. Scanning electron microscopy (SEM), for example, shows intimate, almost seamless bonding at the adhesive-EVOH interface. When a blend of grafted HDPE and EPR is used instead to make the adhesive, the interface is raised and more distinct. Differences are also apparent when atomic force microscopy (AFM) is used to analyze the interface. The inventive tie layers can provide a smooth, undisturbed, nearly flawless interface that is consistent with good adhesion and high clarity. In contrast, when a blend of grafted HDPE and EPR is used to make the adhesive, AFM shows that the interface includes a discrete inter-phase region between the adhesive and barrier layers that is consistent with good adhesion but may also contribute to lower clarity.

Tie-layer adhesives of the invention can be used in numerous multilayer barrier film constructions, including structures having five, seven, nine, or more layers. Illustrative multilayer constructions include the following where "FCL" represents a food contact layer such as LDPE, LLDPE, EVA, ethylene-acrylic acid or ester copolymer, ethylene-methacrylic acid or ester copolymer, ionomers or the like:

HDPE/adhesive/EVOH/adhesive/HDPE
HDPE/adhesive/polyamide/adhesive/HDPE
EVOH/adhesive/HDPE/adhesive/EVOH LDPE/adhesive/polyamide/adhesive/FCL
LDPE/adhesive/EVOH/adhesive/FCL
LLDPE/adhesive/EVOH/adhesive/FCL
LLDPE/adhesive/polyamide/adhesive/FCL
HDPE/adhesive/EVOH/adhesive/FCL
HDPE/adhesive/polyamide/adhesive/FCL Some commonly used sealable film constructions include:
LLDPE/adhesive/EVOH/adhesive/sealant
HDPE/adhesive/polyamide/adhesive/sealant
HDPE/adhesive/EVOH/adhesive/sealant
where the sealant layer is, for example, EVA, LLDPE or ionomer.

When a metal substrate is used, such structures can in include
PO/adhesive/M/adhesive/PO
M/adhesive/PO/adhesive/M
Where PO is a polyolefin layer such as LDPE, LLDPE, HDPE and the like, and M is a metal or metal alloy.

Additives such as antifog components can be added to the multilayer structures, in particular with the external polyolefin layers. Suitable antifog components include glycerol monoesters of a saturated or unsaturated fatty acid having from about 8 to about 20 carbon atoms, glycerol diesters of a saturated or unsaturated fatty acid having from about 8 to about 20 carbon atoms and ionic surfactants having phosphate, sulfate or quaternary amine functional end groups.

Also suitable as antifog compositions are surfactants including anionic, cationic, nonionic and amphoteric surfactants. Suitable ionic surfactants have phosphate, sulfate or quaternary amine functional end groups. Other antifog compositions include sorbitan esters of aliphatic carboxylic acids, glycerol esters of aliphatic carboxylic acids, esters of other polyhydric alcohols with aliphatic carboxylic acids, polyoxyethylene compounds, such as the polyoxyethylene sorbitan esters of aliphatic carboxylic acids and polyoxyethylene ethers of higher aliphatic alcohols. Suitable antifog agents are added as disclosed in U.S. Pat. No. 6,726,968.

The following examples are merely illustrative. Those skilled in the art will recognize many variations and embodiments may be used and still be consistent with the present disclosure.

Component (A): Graft-1 [HDPE/EPR] Composition

Graft-1 is a live, grafted polyolefin produced by feeding a high-density polyethylene (density: 0.957 g/cm$^3$) and maleic anhydride (2.0 wt. % based on total charged reactants) to a first COPERION® ZSK-92 twin-screw extruder having zones heated at temperatures ranging from 450° F. to 660° F. (230 to 350° C.) and operated at shear rates within the range of 200 to 400 rpm to produce a live, grafted polyolefin. After reaction, the live, grafted polyolefin will have an incorporated maleic anhydride content of 1.9 wt % and an MI of 9 g/10 min.

Graft-1 exits the first extruder and immediately enters a second ZSK-92 twin-screw extruder, where it is combined and reacted with an ethylene-propylene rubber, namely EPR-1. EPR-1 is Nordel® 3722 (product of Dow Chemical having 72 wt. % ethylene recurring units). Conditions in the second extruder: temperature range: 300° F. to 450° F. (150 to 230° C.); shear rate: 200 to 400 rpm. The resulting graft [HDPE/EPR] product is cooled and pelletized.

Graft component (A-1) is formulated by this process with 35% EPR-1.

Component (B): Base Resin

As illustrated in the examples summarized herein, component (B) can be a base resin. The base resin can be a linear polyethylene. In these examples, LLDPE-1 employed is the linear low density polyethylene PETROTHENE® GA602050. GA602050 is a pelletized hexene copolymer linear low density polyethylene (density: 0.917 g/cm$^3$; Melt Index, MI2: 2.0 g/10 min.).

Component (C): ADDITIVES

As illustrated in the examples provided herein, Component (C) can be one or more additives. For example, IRGANOX® 1076 and IRGAFOS® 168 are employed as antioxidants. IRGANOX® 1010 is a sterically-hindered phenolic antioxidants available from CIBA. IRGAFOS® 168 is a trisarylphosphite processing stabilizer also available from CIBA.

Example 1

Tie Layer 1

Tie-Layer Adhesives from Composition (A-1)[HDPE/EPR] The pelletized graft [HDPE/EPR] composition (A-1) is melt blended at 20 wt % in an extruder at 200-240° C. and 210-250 rpm with Irganox 1010 antioxidant (0.1 wt. %), Irgafos 168 antioxidant (0.1 wt. %), and LLDPE-1 (balance to 100 wt. %) to produce a tie-layer adhesive. This composition can be referred to as Tie layer 1.

Comparative Tie Layer 2

Tie-Layer Adhesives from Blends of

Grafted HDPE, EPR and LLDPE

Graft-1 (13 wt. %) is blended with Irganox 1010 (0.1 wt. %), Irgafos 168 (0.1 wt. %), pellets of LLDPE-1 and pellets of EPR-1 (7 wt. %) where Graft-1 is no longer a live polymer. Accordingly, non-live Graft-1 has been quenched or reacted out and worked up to a final form prior to blending. The dry mixture is melted and mixed in the extruder (200-240° C., 210-250 rpm).

Table 1 as follow shows the composition of Tie layer 1 and comparative tie layer 2:

TABLE 1

| Components | Tie Layer 1 (wt. %) | Comparative Tie Layer 2 (wt. %) |
|---|---|---|
| Graft Component (A-1) Extruded Graft-1 + EPR-1 (35 wt %) | 20 | 0 |
| Non-live Graft-1 | 0 | 13 |
| EPR-1 | 0 | 7 |
| (B) LLDPE-1 | 79.8 | 79.8 |
| (C) IRGANOX ® 1076 | 0 | 0.1 |
| (C) IRGAFOS ® 168 | 0.1 | 0.1 |

As can be seen, the significant difference between Tie layer 1 and comparative Tie layer 2 is that in the formation of Tie Layer 1, components live Graft-1 and EPR-1 are reacted together prior to combining with the LLDPE-1 base resin. In comparative Tie Layer 2, the Graft-1 and EPR-1 are blended together with LLDPE-1 and the other components.

The tie layer compositions are formed into 6 mil films by use of a killion extruder.

Metal Adhesion

The Tie layer 1 and comparative Tie layer 2 were then tested with respect to metal adhesion. For comparison, a simulated ring peel test was conducted using aluminum (Reynolds al 3001) as the metal substrate. In this test, Tie layer 1 and comparative Tie layer 2 were cut into 5"×2" strips and sandwiched between 5.5"×2" aluminum strips, preheated to 420° F. and pressed at 1-2 tons for 5 minutes. Pressure is then increased to 20 tons for 30 seconds. The strips are then cooled to room temperature at a pressure of 20 tons. 1 cm wide samples were then cut and made into a ring around a shaft attached to the lower Instron grip. The tie layer assemblies are then peeled at 50 mm/min at a temperature of 90° C. The results are shown in FIG. 1 with Tie layer 1 having an adhesion of 157 N/10 mm and comparative Tie layer 2 having an adhesion of 105 N/10 mm.

Therefore, surprisingly, the tie layer composition comprising the reaction product of a live, grafted polyolefin and an olefin elastomer produced superior bonding to metals over conventional tie layer adhesives.

What is claimed is:

1. A process for preparing a multilayer structure comprising:
   preparing an adhesive tie layer composition by:
   (i) reacting an unsaturated monomer with a polyolefin to produce a live, grafted polyolefin,
      wherein the unsaturated monomer is used in an amount between 0.1 to 15 wt. %, based on the live, grafted polyolefin produced and wherein the reacting step (i) excludes an olefin elastomer;
   (ii) reacting the live, grafted polyolefin and the olefin elastomer at a temperature of 120-300° C. to produce a graft composition,
      and wherein at least 90% of the unsaturated monomer is incorporated into the graft composition, and
      wherein the graft composition has an adhesive strength of greater than or equal to 120 N/10 mm at a rate of 50 mm/min and a temperature of 90° C. as measured by pulling a 5"×2"×1" tie layer adhesive strip from a metal substrate; and
   bonding the graft composition to a metal substrate;
   wherein the olefin elastomer is ethylene-propylene rubber (EPR) or ethylene-propylene-diene monomer rubber (EPDM) and the amount of olefin elastomer ranges from 30-40% by weight, based on the amount of graft composition produced.

2. The process of claim 1, wherein the metal substrate is a metal, metal oxide or alloy comprising aluminum, tin, zinc, nickel, copper, platinum, gold, silver, palladium, chromium, cobalt, steel, iron, or mixtures thereof.

3. The process of claim 1, wherein the live, grafted polyolefin is high-density polyethylene (HDPE) grafted with maleic anhydride.

4. The process of claim 1, wherein the adhesive layer composition is also adhered to a polyolefin layer.

5. The process of claim 1, wherein the graft composition is blended with a base resin.

6. The process of claim 1, wherein the adhesive tie layer composition has an adhesive strength of greater than or equal to 135 N/10 mm.

7. The process of claim 1, wherein the adhesive tie layer composition has an adhesive strength of greater than or equal to 150 N/10 mm.

8. The process of claim 1, wherein the adhesive tie layer composition has an adhesive strength in a range of 120-185 N/10 mm.

* * * * *